2 Sheets—Sheet 1.

J. GOODRICH & H. J. COLBURN.

Assignors to W. H. DOANE.

Planing-Machine.

No. 8,438. Reissued Oct. 1, 1878.

Attest:
H. L. Perrine
Chas. Ashton

Inventors:
James Goodrich
Henry J. Colburn
by their attorney
R. H. Bishop

2 Sheets—Sheet 2.

J. GOODRICH & H. J. COLBURN.

Assignors to W. H. DOANE.

Planing-Machine.

No. 8,438. Reissued Oct. 1, 1878.

Attest:
H. L. Perrine
Chas. Hirsch

Inventors:
James Goodrich
Henry J. Colburn
by their attorney
W. H. Doane

UNITED STATES PATENT OFFICE.

JAMES GOODRICH AND HENRY J. COLBURN, OF FITCHBURG, MASSACHUSETTS, ASSIGNORS TO W. H. DOANE, OF CINCINNATI, OHIO.

IMPROVEMENT IN PLANING-MACHINES.

Specification forming part of Letters Patent No. 111,632, dated February 7, 1871; Reissue No. 8,438, dated October 1, 1878; application filed September 19, 1878.

*To all whom it may concern.*

Be it known that we, JAMES GOODRICH and HENRY J. COLBURN, of Fitchburg, in the county of Worcester and State of Massachusetts, have invented certain new and useful Improvements in Planing-Machines, of which the following is a specification:

The nature of our invention consists in certain improvements relating to the more complete adjustment of the knife-cylinder, the pressure-feet, and the feeding-apron to the article being worked; also, in such an arrangement of rollers for pressing the lumber against the feeding-apron or other lumber-supporting surface that several strips of lumber of varying thickness can be independently pressed against the lumber-supporting surface and properly fed through the machine at one and the same time.

Figure 1:
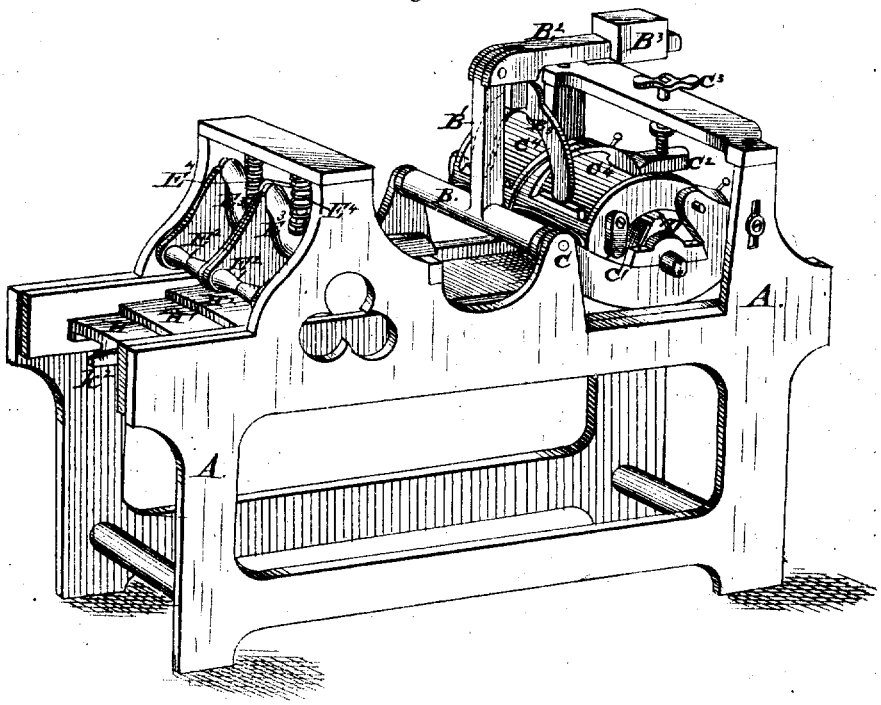
Figure 6:
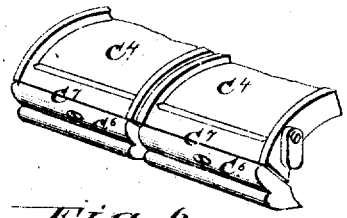
Figure 2:
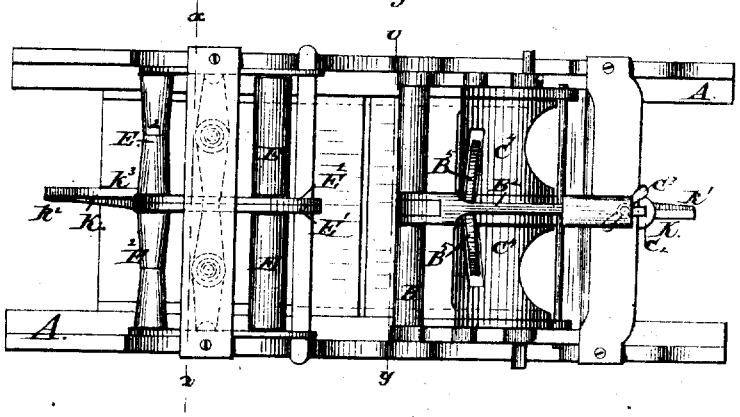
Figure 3:
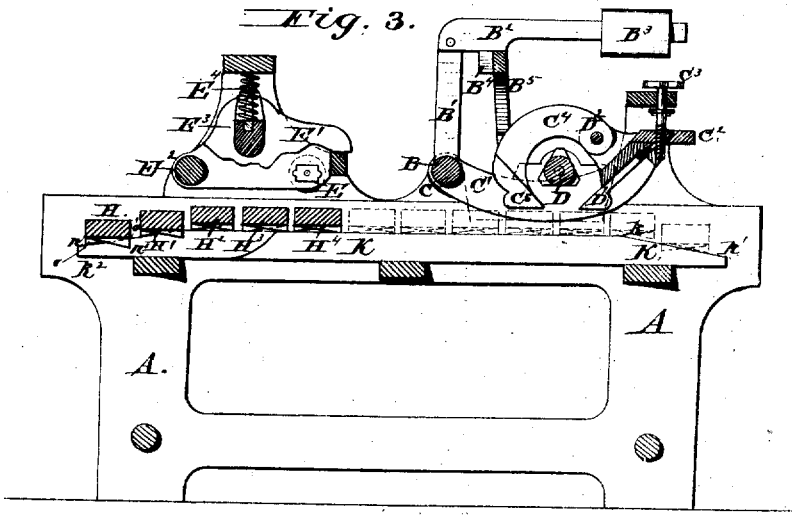
Figure 4:
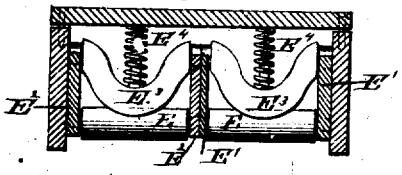
Figure 5:
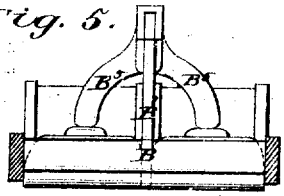

Referring to the accompanying drawings, Figure 1 is a perspective view, showing our invention embodied in a complete planing-machine. Fig. 2 is a plan of the same. Fig. 3 is a vertical section of the same. Fig. 4 is a vertical cross-section on the line $x$ $z$, Fig. 2. Fig. 5 is a vertical section on the line $v$ $y$ of Fig. 2. Fig. 6 is a perspective, showing the pressure-feet in detail.

In the drawings, A A represent the frame of our machine, to which the operating parts are attached. This frame has attached internally to its sides guide-rails, (not shown in the drawing,) upon which the lags H $H^1$ $H^2$ $H^3$, Figs. 1 and 3, of the endless feed-apron run.

Under the center of these lags double inclines $o$ $o'$ and $n$ $n'$ are attached, and so arranged, in connection with the central guide-rail, K K, (which is inclined at each end, as shown in Figs. 2 and 3,) that the upper face of the lag will assume a horizontal position as soon as the lag comes in contact with the central rail, K K.

By this arrangement no part of the lag, as it comes up onto the straight part of the guides, will project beyond the proper level.

The inclines $k^2$ $k^3$ and $k$ $k^1$, Figs. 2 and 3, are not in the same vertical plane, so that the incline $o$ $o'$ of the lag will come in contact with the incline $k^2$ $k^3$ of the center guide, K, while the incline $n$ $n'$ of the lag will come in contact with the incline $k$ $k^1$ of the guide K. Thus the lags will maintain the level position while entering upon and leaving the guide K.

The object of the arrangement of the inclines $n$ $n'$ $o$ $o'$ on the under side of the lags, and the inclines $k$ $k^1$ $k^2$ $k^3$ on the central guide, K, is to cause the lags H $H^1$, &c., to gradually assume a horizontal position before their upper faces reach the general level of the apron. The advantage of this is, that as the lags pass up onto the straight part of the guide the advancing edge will not extend above the general level, as it would in case there were no inclines on the under side of the lags.

If desirable, the inclines $k$ $k^1$ $k^2$ $k^3$ may be curved.

$C^1$, Figs. 1 and 3, is a swinging frame, pivoted at C. To this frame the cutter-head D, which extends entirely across the machine, and the adjustable weights $C^4$ $C^4$ and pressure-bars $D^1$, are attached. The bars $D^1$ are attached to the swinging frame in the ordinary manner.

$C^3$ is an adjusting-screw, by means of which the swinging frame $C^1$ is adjusted to the work. $C^4$ $C^4$ are swinging weights, pivoted to the swinging frame $C^1$ at $D^2$. $C^6$ $C^6$ are adjustable pressure-feet, connected by pivots $C^7$ $C^7$ to the swinging weights $C^4$ $C^4$.

$B^5$, Figs. 1 and 5, is a pressure-arc, the ends of which rest on the swinging weights $C^4$ $C^4$. This pressure-arc is pivoted to the weighted lever $B^2$, so that the pressure of the weight $B^3$ will act equally upon the swinging weights $C^4$ $C^4$.

The rocker-shaft B and arc $B^1$ serve to connect the lever $B^2$ to the frame of the machine.

The pressure-rollers E E, Figs. 2, 3, and 4, are connected to independent swinging arms $E^1$ $E^1$ $E^2$ $E^2$, so that they are free to follow the surface of the article to be planed, the journals of the rollers having boxes so arranged that this action can take place.

$E^3$ $E^3$, Fig. 4, are yokes, the ends of which rest upon the arms $E^1$ $E^1$ $E^2$ $E^2$. Upon the middle of these yokes springs $E^4$ $E^4$ press, so that the arms $E^1$ $E^1$ $E^2$ $E^2$, and consequently the rollers E E, are pressed constantly downward against the work.

In the machine illustrated is used only one set of short rollers, which collectively may be termed a "broken" or "divided" roller, consisting of two independent rollers arranged end to end to span the width of the feeding-apron, or thereabout, by their combined length. The roller opposite to the right-hand portion or zone of the lumber-supporting surface (the feeding-apron in this instance) being adapted to rise and fall independently of the roller opposite to the left-hand portion or zone thereof, it is obvious that two narrow strips of lumber differing in thickness can be simultaneously fed through a machine containing such a divided or broken roller, thereby greatly enlarging the capacity of the machine. At the same time single wide strips of lumber can be worked through the machine as usual.

What we claim as our invention is—

1. The combination of the lags H $H^1$ $H^2$, &c., having inclines *n n'* and *o o'*, with the guide-rail K, having inclines *k* $k^1$ $k^2$ $k^3$, as described, and for the purpose set forth.

2. The combination of the adjustable frame $C^1$ with the cutter-head D and pressure-bar $D^1$, as herein described, and for the purpose set forth.

3. The combination of the lever $B^2$ with the arc $B^5$, adjustable weights $C^4$ $C^4$, and pressure-feet $C^6$, substantially as described, and for the purpose set forth.

4. The combination of the springs $E^4$ $E^4$ with the yokes $E^3$ $E^3$, the bearing frames or boxes $E^2$ $E^2$ $E^1$ $E^1$, and the rollers E E, as herein described, and for the purpose set forth.

5. In a wood-working machine, the combination, substantially as specified, of a lumber-supporting surface and independent yielding rollers, one of which extends only part way across said surface from one side of the machine, whereby one wide piece or simultaneously two narrow pieces of lumber (whether of equal or unequal thickness) can be worked through the machine.

6. In a wood-working machine, the combination, substantially as specified, of a lumber-supporting surface and a divided or broken roller, consisting of independently-supported yielding sections or short rollers, arranged across the said surface, whereby one wide piece or simultaneously two narrow pieces of lumber (whether of equal or unequal thickness) can be worked through the machine.

7. In a wood-working machine, the combination, substantially as specified, of a lumber-supporting surface, a divided or broken roller, consisting of independent yielding sections or short rollers, and an independent center-bearing support for each of the sections of the divided or broken roller.

8. The combination, substantially as specified, of the cutter-head, extending entirely across the machine, and independent yielding rollers for pressing the lumber against the lumber-supporting surface along different portions or zones of its width.

In testimony whereof we have signed our names to the foregoing specification in the presence of two subscribing witnesses.

JAMES GOODRICH.
HENRY J. COLBURN.

Witnesses:
MORTIMER J. ENNIS,
JAMES D. RIBLET.